(12) United States Patent
Balogh (10) Patent No.: US 6,736,512 B2
(45) Date of Patent: May 18, 2004

(54) PIXEL ELEMENT FOR A THREE-DIMENSIONAL SCREEN

(75) Inventor: Tibor Balogh, Budapest (HU)

(73) Assignee: Sony International (Europe) GmbH, Berlin (DE)

( * ) Notice: Subject to any disclaimer, the term of this patent is extended or adjusted under 35 U.S.C. 154(b) by 381 days.

(21) Appl. No.: 09/788,974

(22) Filed: Feb. 20, 2001

(65) Prior Publication Data

US 2001/0028356 A1 Oct. 11, 2001

(30) Foreign Application Priority Data

Feb. 21, 2000 (HU) .............................................. 0000752

(51) Int. Cl.[7] ........................ G03B 21/00; G03B 35/00; G03H 1/12; G02B 5/32; G02B 27/22
(52) U.S. Cl. ................................ 353/7; 353/10; 359/11; 359/20; 359/23; 359/462; 345/88; 345/90; 352/57; 352/203; 349/7; 349/8; 348/51
(58) Field of Search ........................... 359/1, 10–11, 359/15, 20, 23, 462–464; 353/7, 10; 345/87–88, 90–91; 352/57, 198, 203; 349/5, 7–8; 348/42, 51

(56) References Cited

U.S. PATENT DOCUMENTS

| | | | | |
|---|---|---|---|---|
| 5,132,839 A | * | 7/1992 | Travis | 359/462 |
| 5,465,175 A | * | 11/1995 | Woodgate et al. | 359/463 |
| 5,521,724 A | * | 5/1996 | Shires | 359/22 |
| 5,680,171 A | * | 10/1997 | Lo et al. | 348/42 |
| 5,867,240 A | * | 2/1999 | Crawford et al. | 349/118 |
| 6,061,039 A | * | 5/2000 | Ryan et al. | 345/55 |
| 6,157,424 A | * | 12/2000 | Eichenlaub | 349/74 |
| 6,351,268 B1 | * | 2/2002 | Genoe | 345/607 |
| 6,386,720 B1 | * | 5/2002 | Mochizuki | 362/27 |
| 6,533,420 B1 | * | 3/2003 | Eichenlaub | 353/7 |
| 6,547,400 B1 | * | 4/2003 | Yokoyama | 353/98 |

FOREIGN PATENT DOCUMENTS

EP   316465 A1  *  5/1989  ........... H04N/13/04

* cited by examiner

Primary Examiner—Russell Adams
Assistant Examiner—Magda Cruz
(74) Attorney, Agent, or Firm—Frommer Lawrence & Haug LLP; William S. Frommer (57) ABSTRACT

A pixel element for a 3D display, wherein multiple substantially collimated controllable light beams are emitted in multiple directions, with each light beam associated with a predetermined viewing direction. A set of substantially point type sources are individually addressable and are arranged in a line. The light sources are serially addressed; and the light from each source is imaged in a collimated light beam and deflected in a predetermined individual deflection direction.

18 Claims, 9 Drawing Sheets

PIXEL ELEMENT FOR A THREE-DIMENSIONAL SCREEN

TECHNICAL FIELD

The object of the invention is a pixel element for a three-dimensional screen. The pixel element of the invention comprises means for generating multiple substantially collimated, controllable light beams. These light beams are emitted in multiple directions, so that each light beam is associated to a predetermined viewing direction.

BACKGROUND ART

Various methods and devices have been suggested to achieve a true three-dimensional image (3D image). The underlying principle of all true 3D methods is the same. If a plane—two-dimensional—image is displayed on a surface, then every point of the surface emits or reflects light with approximately same intensity (and colour) in all directions. This is the working principle of a traditional picture, like a postcard (reflection) or a traditional TV-image (light emission). In the case when a three-dimensional image is presented, the emitted light has a different intensity (and colour) in the different directions, even if it is emitted from the same point. We may regard in this way a window pane or a hologram as a display. Hence, in order to display a three-dimensional image, there is needed a light emitting surface where the intensity (and colour) of the light emitted from a single image point (pixel) may be controlled as the function of the emission angle (exit angle), with other words, the intensity of the light emitted in the different directions may be controlled.

In order to produce true or realistic three-dimensional images, two technical problems must be solved. Firstly, a large number of light beams must be projected in the different directions in space, with the appropriate intensity/colour, which allow the viewer to see different perspectives from different viewpoints. Secondly, means must be provided to allow the feeding of the necessary data to the light sources generating the light beams. This second problem involves difficulties when video images (i.e. moving images) must be displayed, because large amounts of data (kB/s) must be forwarded into each (!) image point or pixel. Obviously, a true 3D video image providing n different viewing directions require n times the data amount of a normal video image.

There are many known technical solutions that addresses the problem of the directed light beams. The Hungarian Patent application published under No. T/63 503 discloses two methods for the presentation of three-dimensional images.

In a first version, a modulated laser beam is subjected to deflection which is controlled in time. The deflection is performed before the image pixels, according to the directions defining the viewing range. In this manner the modulated laser beam enters the image pixel deflected with an angle, the beam is parallel translated. From the image pixel the laser beam propagates with an optical deflection corresponding to the view range, or propagates further in different directions within the viewing range without further deflection. A disadvantage of this solution is that the laser beam must be focused and positioned very precisely, because the entry point of the laser beam within the image pixel defines the direction of the exiting laser beam.

In the second version, the modulated laser beam enters an image pixel in the same entry point, without deflection, and it is deflected towards the different viewing angles within the image pixel, with the help of a controllable active optical element positioned in the image pixel. The deflection of light beam with the angle-dependent intensity is performed by the active optical element. The advantage of the solution is that the positioning and focusing of the beam need not be very exact, but the active optical elements make the device extremely expensive. Also, the problem of the feeding of the data to the active pixels is not discussed.

In other known methods, in order to display true 3D images, two surfaces are used, where the first front surface is a surface with a controllable light transmission, and the second back surface is an illuminating surface comprising light sources. One point of the back surface and one point of the front surface defines unequivocally a direction. With a possible embodiment, the image is created on the back surface by controlling the intensity and/or colour of the light sources, while on the first surface only masking is performed according to the selected viewing directions, by switching the image pixels on and off. With an other possible embodiment, the light sources on the back surface are continuously on, or they are only switched on or off, while the controlling according to the image information is made on the first surface. The first surface comprising the image pixels with controllable light transmission is preferably an LCD display.

Such solutions utilising an LCD display are disclosed, among others, in the documents EP 0 316 465 and U.S. Pat. No. 5,132,839. Here, illuminated strips are used behind an LCD screen, and the light of the strips are either transmitted or blocked by the controlled image pixels of the LCD screen.

In the solution disclosed in EP 0 316 465, there is an illuminated line behind every pair of LCD-pixel columns, and the light of the line passes through either one column or the other, corresponding to the control of the LCD pixels. This arrangement allows the display of a stereoscopic image with two viewing directions, but the resolution of the LCD-display is low, because two LCD-pixels are needed for an image point. The description suggest to increase the number of LCD-pixels associated to one illuminating line, in order to increase the number of viewing directions, but this leads to a further lowering of the resolution. There is no teaching how the data must be fed to the LCD-pixels.

With another possible embodiment, it is suggested to use one illuminating line (light source) behind each LCD-pixel column. In this case every pixel is illuminated by multiple light sources, which results in several viewing directions, having independently controllable light emissions in the same image point. Such a display is described in the publication "A prototype flat panel hologram-like display that produces multiple perspective views at full resolution", by J. Eichenlaub, in: Proceedings of the SPIE Vol. 2409, pp. 102–112. Here, the number of the light sources is essentially equal to the number of the image pixels in a line. Therefore, in order to produce an image with an acceptable resolution, a large number of very small light sources are needed. These light sources are extremely expensive, due to their small size and the large quantity needed. The light sources may be manufactured by optical methods (e.g. cylindrical lens matrix, disclosed in WO 94/06249), but this requires again a very precise and costly technology, and the illumination angle is also limited. A further disadvantage of this approach is the limited intensity which may be achieved. The application of this system for moving images is clearly limited by the addressing speed of the LCD screen, and the switching speed of the light sources.

The need to provide several emitting directions from one image point is also recognised in the solution described in U.S. Pat. No. 5,521,724 (Shires). In this solution a simple electronic display is presented, which produces 3D images by binocular parallax. The effect is produced by the pixels of a traditional 2D display, which are spatially multiplexed by holographic elements. The problem of the data speed is not discussed.

There are also disclosed various forms of lenticular lens systems, which provide outgoing light beams according to different viewing directions. Such a solution used to create an autostereoscopic display is described in EP 0 786 912 A2. Again, in this document there is no teaching how the large amount of data may be fed into the subpixels of the image pixels (essentially, the pixels of an SLM, see FIG. 11.), which then produce the different images in different directions through the lenticular lenses.

In the field of laser printers, LED arrays arranged in a line are already known. These arrays contain individually adressable light sources. However, it has not been suggested to use such a LED array to produce light beams which are radiating in different directions, and thereby achieving 3D images.

Accordingly, it is an object of the present invention to provide a pixel element which simultaneously solves the optical problem of the multiple directed light beams and the problem of the data transfer to the light sources. It is a further object to provide a pixel element that is relatively easy to manufacture, replaceable, and require simple supporting systems, both in mechanical, optical, and electronic terms.

SUMMARY OF THE INVENTION

The above objectives are reached by a pixel element for a 3D screen, comprising means for generating multiple substantially collimated, controllable light beams emitted in multiple directions, so that each light beam is associated to a predetermined viewing direction. According to the invention, the pixel element comprises at least one set of substantially point source type, individually addressable light sources arranged in a line, and optical imaging means for imaging the light of each light sources in a collimated light beam and for deflecting each collimated light beam in a predetermined individual deflection direction, and further comprising means for serially addressing the light sources.

Especially, it is foreseen that the addressing means comprises a serial input shift register and/or a multiplexer for distributing the information from the input shift register to the individual light sources.

It is also suggested to use three sets of light sources radiating in the RGB colours, where each set is arranged in a line parallel with the other sets. Alternatively, one set of light sources may be arranged in multiple parallel lines. One line of light sources may be imaged by a lenticular matrix and/or an objective lens, which is associated to the line of the light sources.

In a particular embodiment, the addressing means comprises memory means for storing the input information of several operation cycles. It is also foreseen that the addressing means comprises means for evaluating the state of the light sources radiating in the neighbouring deflection directions.

The invention also includes a novel 3D display comprising pixel elements according to the invention.

Essentially, there is provided a novel light emitting pixel element, particularly for 3D screen applications. The main feature of such a pixel element is the ability to generate several independent light beams within a single unit, and without the use of expensive and bulky active optical elements. These light beams are emitted in several independent directions, so that each light beam is associated to a predetermined viewing direction. The different light beams are practically collimated, in order not to interfere with the neighbouring viewing directions. To achieve a true 3D effect, each independent light beam must be controllable on its own. The light beams are realised in the form of miniature diode lasers or LEDs, which function as substantially point source type, individually addressable light sources. The light sources are arranged in a line, which facilitates their deflection with a common optical projection system. Colour screens are created with three lines of light sources radiating in the RGB colours. The coloured lines of the light sources are positioned sufficiently close to each other, so the light beams appear to be emitted from one source.

This optical projection system includes means for imaging the light of each light sources in a collimated light beam, preferably a matrix of miniature lenses. The generated set of the parallel, collimated light beams are deflected in predetermined individual deflection directions, which corresponds to the viewing directions. This deflection is effected with a common objective lens. To keep the wiring and addressing within feasible limits, the pixel elements are provided with appropriate means for serially addressing the light sources. E.g. a serial input buffer or shift register, and/or a multiplexer could be integrated on the same chip or at least on the same ceramic plate which carries the light sources and their driver circuits.

The suggested pixel element is currently limited to provide 3D image along one axis (co-ordinate) only. To increase the viewing angle along the other axis, it is foreseen to apply a holographic plate or a cylindrical lens system as a means for establishing a divergence (diffusion) of the light beams perpendicular to the plane of deflection. To achieve a continuous image, when moving from one viewing angle to another, it is also suggested to apply some sort of diffusor to establish a divergence of the light beams in the plane of deflection. This divergence should be sufficient to cause an overlap of the edges of neighbouring light beams at least in a distance from the pixel element. The divergence or diffusion of the light beams could be done with the same holographic element, both in the perpendicular and the parallel direction.

It is fully feasible to provide the addressing logic of the pixel elements with intelligent features, like a firmware-type microprogram for evaluating the state of the light sources in neighbouring pixel elements. In this manner the whole screen of the pixel elements could act as a distributed processing unit, and e.g. certain functions of the data compression and decompression algorithms could be assigned to the microprograms in the pixels.

However, the greatest advantage of such a pixel element is the inherent simplicity of the device, which fully substitutes the functions of complicated and sensitive optical arrangements for producing a true 3D image. The pixel elements according to the present invention may be used to produce 3D screens in various sizes and resolution, using the same basic unit. The pixel element itself is relatively low-cost, if produced in large quantities. The necessary technologies to produce the different parts of the pixel element are all available and already tested in practice. The pixel element of the invention allows the realisation of a very powerful and sophisticated, and at the same time mass-produced and low-cost 3D screen.

BRIEF DESCRIPTION OF DRAWINGS

By way of example only, embodiments of the invention will now be described with reference to the accompanying drawings, in which.

BEST MODE FOR CARRYING OUT THE INVENTION

Figure 1:
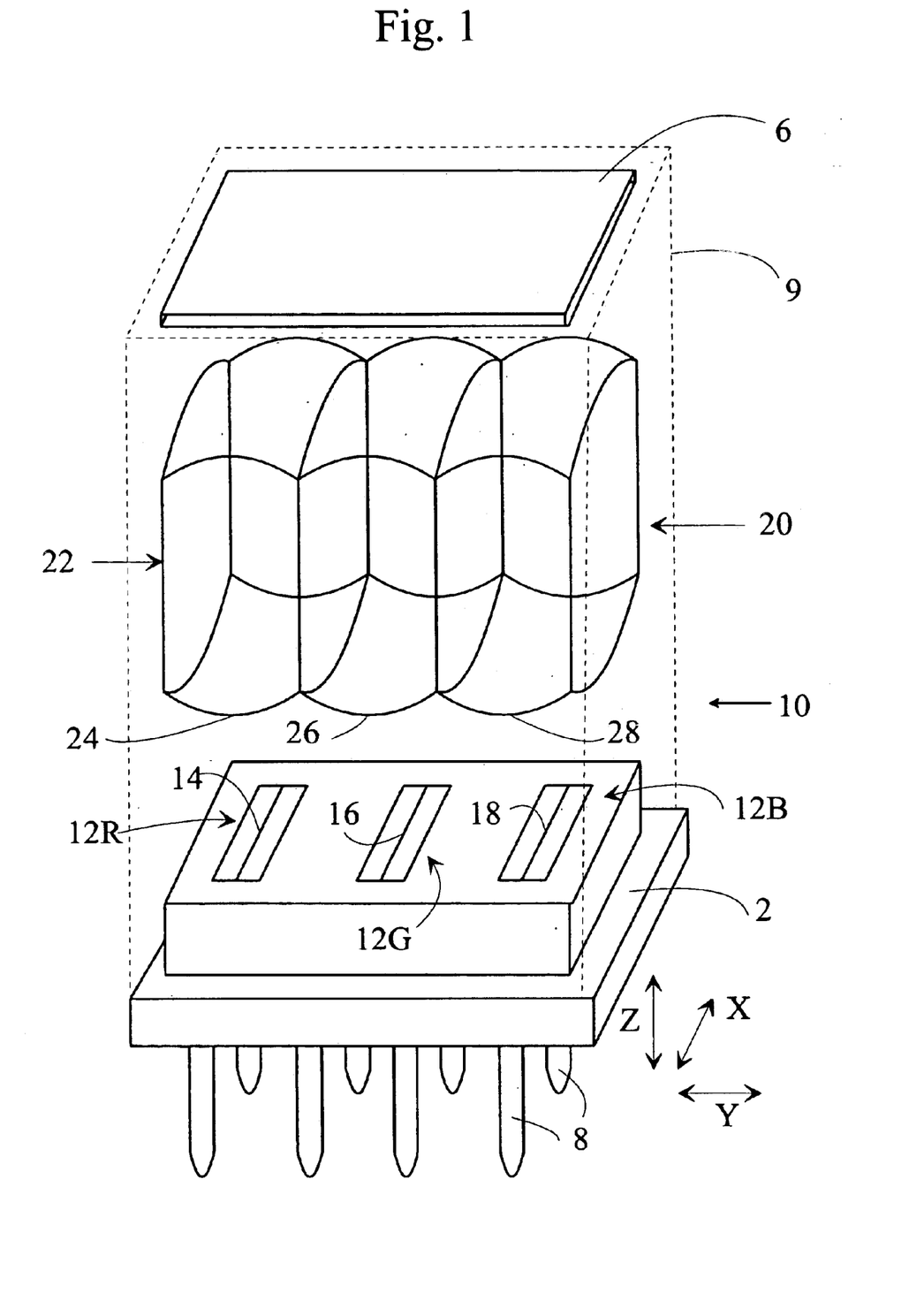
FIG. 1 is a perspective view of the pixel element according to the invention.
Figure 2A:
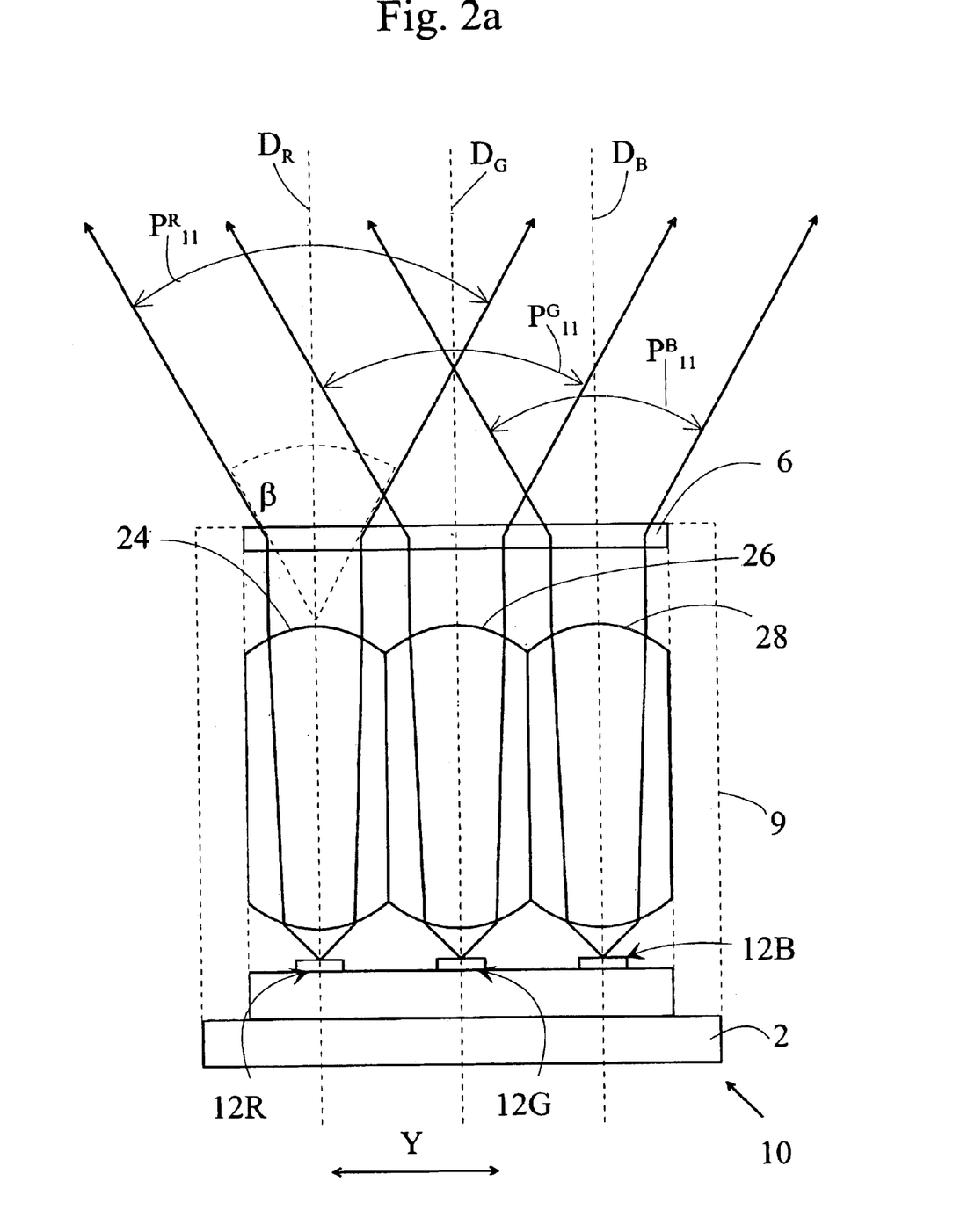
FIGS. 2a–c are two side and top views of the pixel element of FIG. 1, FIGS. 3a–b are a schematic top and front views of a display provided with the pixel elements of the invention, and illustrating the working principle of a 3D display.
Figure 2B:
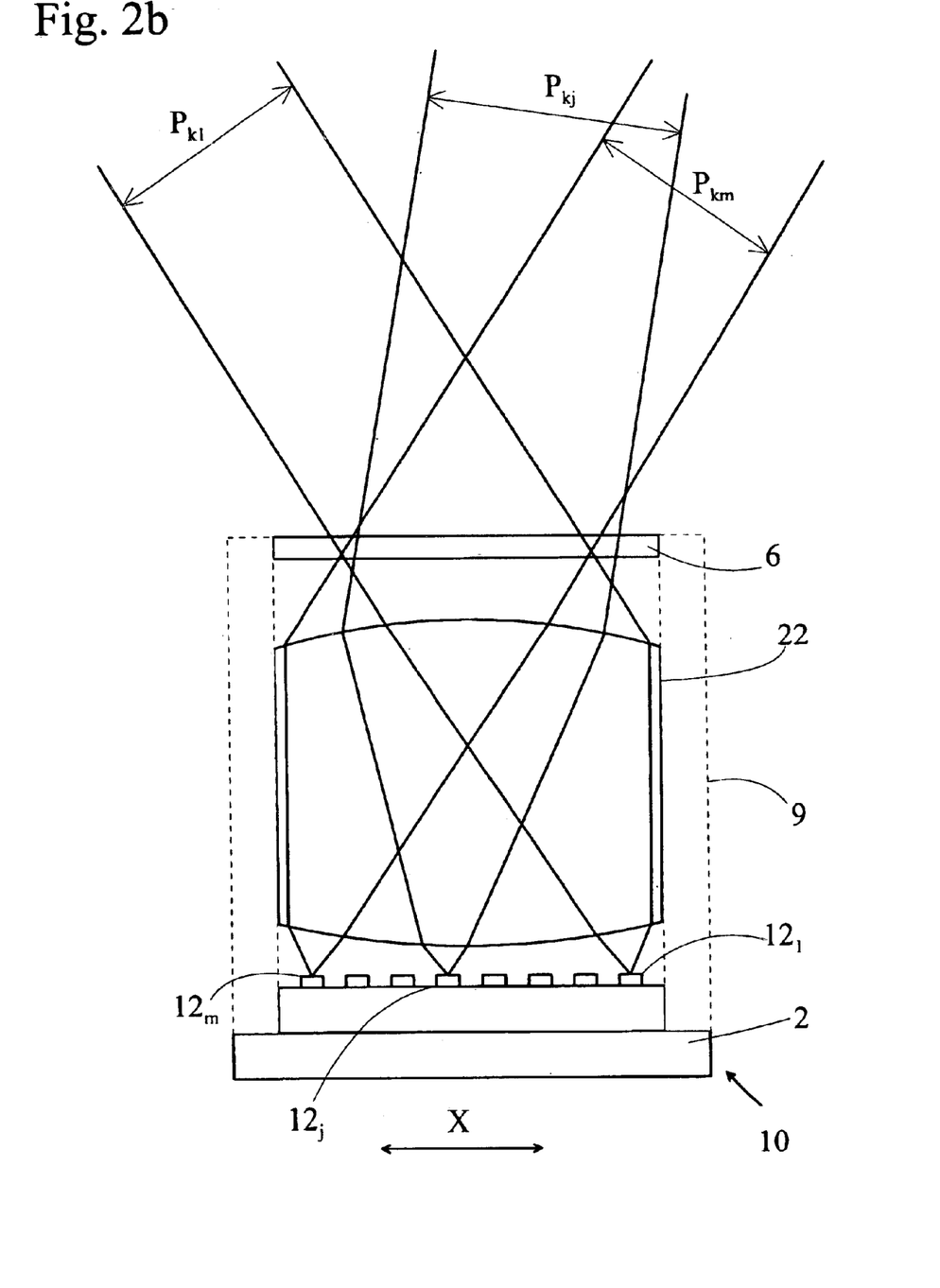
Figure 2C:
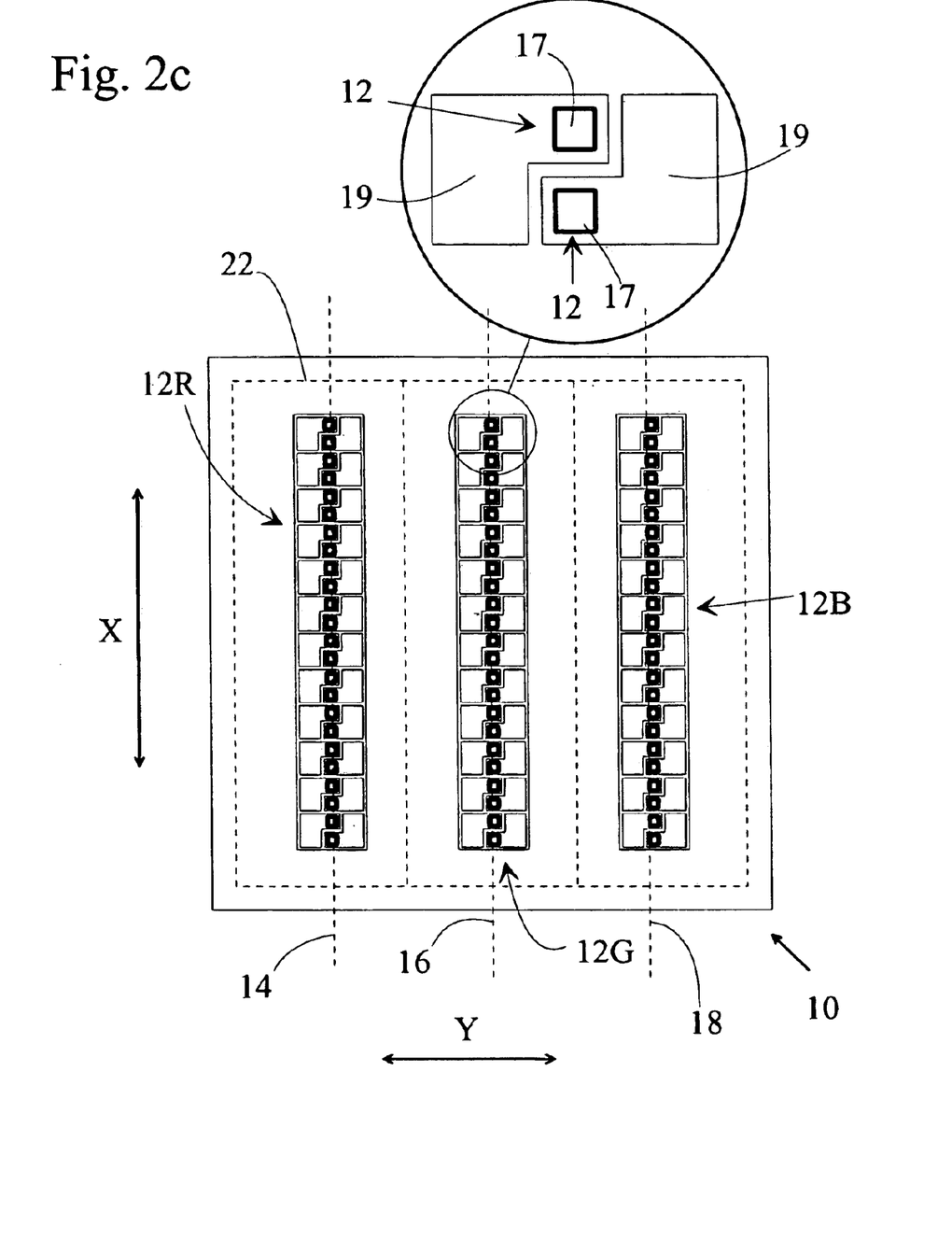
Figure 3A:
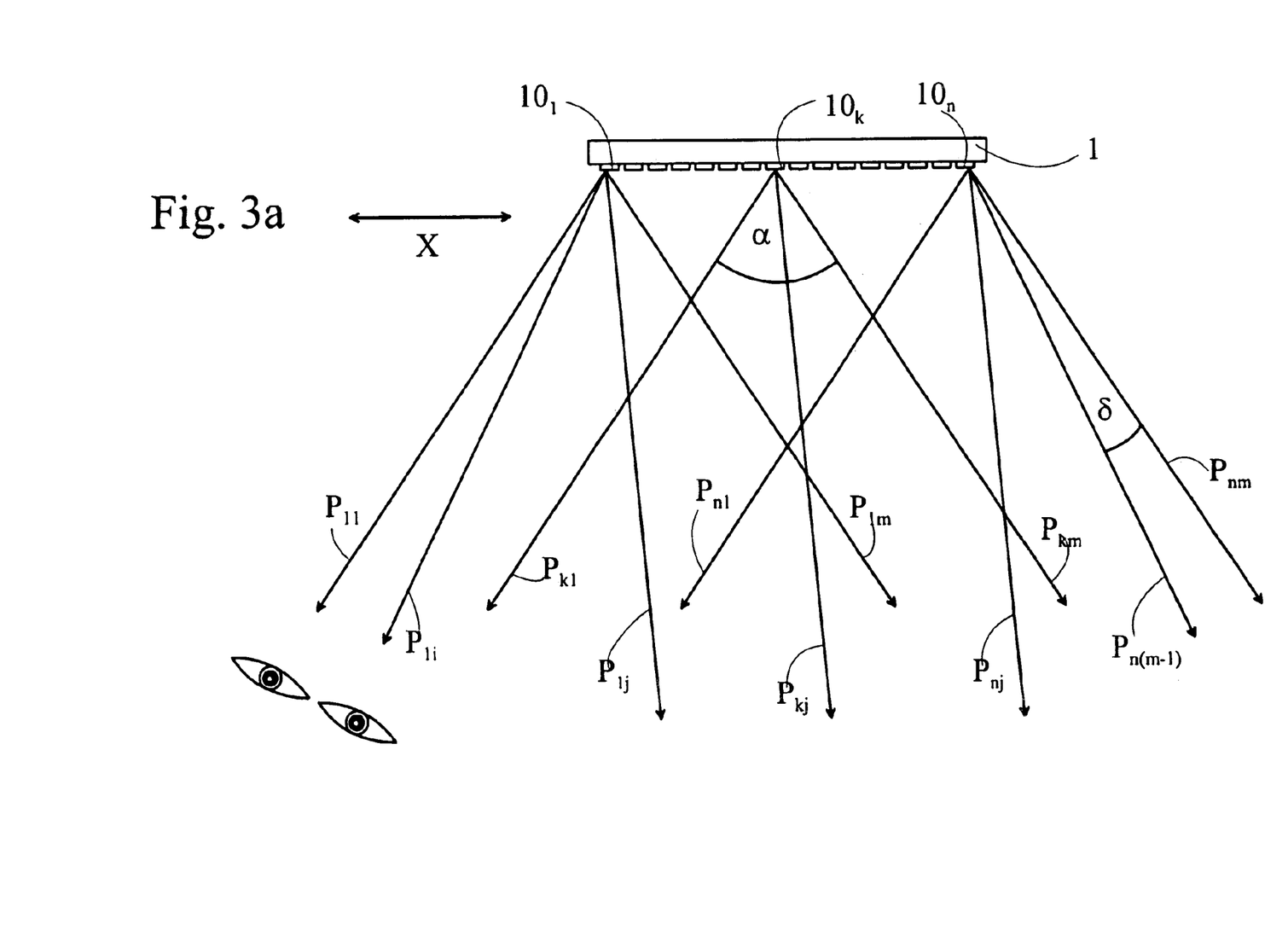
Figure 3B:
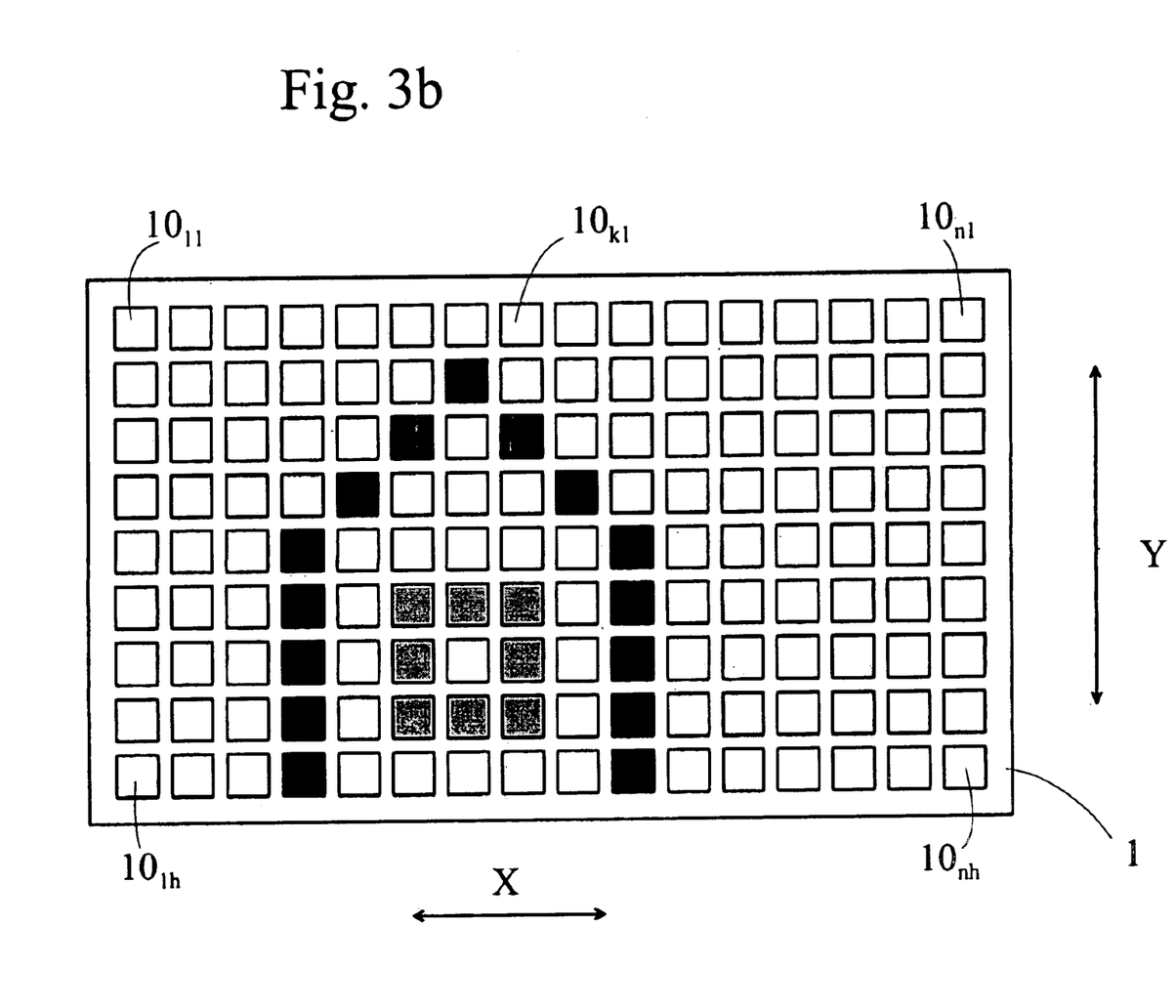

Referring now to FIGS. 1 to 3, there is shown a pixel element 10 for a 3D display, e.g. a screen 1. As best seen in FIG. 3b, the screen 1 consist of the pixel elements $10_{11}$–$10_{nh}$, arranged in lines and columns. There are n pixels in a line and h pixels in a column. In a practical embodiment, the screen 1 contains approx. 860×480 pixels to achieve a 16:9 W/H ratio wide screen.

The pixel element 10, as shown in FIG. 1, essentially consists of an electronic base unit 2, an optical imaging means 20 and a holographic top plate 6. The electronic base unit 2 is provided with connecting legs 8. The electronic base unit contains the electronic parts of the pixel element 10, which are explained with reference to FIGS. 4–6 below. The optical imaging means 20 is a triple lens 22, the role of which will be explained below. The optical imaging means 20 and the top plate 6 are surrounded by a housing 9 (indicated with dotted line only), which serves as the mechanical support of the optical imaging means and the top plate 6.

The pixel element 10 comprises at least one set of substantially point source type, individually addressable light sources $12_1$–$12_m$. There are m separate light sources 12 in one set, where m=64 in the presented embodiment (only twenty-four is shown in FIG. 2C, and only eight in FIG. 2b, for easier illustration). One set of the light sources $12_1$–$12_m$ is arranged in a line, e.g. along the X direction. In the shown preferred embodiment, there are three sets of light sources 12R, 12G, 12B, corresponding to the RGB colours, and arranged along three lines 14,16,18, symbolised by a dotted line in FIG. 2c. The light sources 12 are embodied by LEDs 76 (see also FIG. 6) which are manufactured on a common wafer (see enlarged part of FIG. 2c, where the active area 17 and the wiring surface 19 of the LEDs 76 are shown). The LEDs 76 along the line 14 emit red light, the LEDs 76 along the line 16 emit green light, while the LEDs 76 along the line 18 radiate in the blue.

The pixel element 10 comprises means for generating multiple substantially collimated, controllable light beams $P_1$–$P_m$ from the light emitted by the light sources 12. As we will see later, the light beams are collimated along the X direction only, while in the Y direction they have a substantial divergence.

The pixel element 10 is provided with optical imaging means 20 for imaging the light of each light source $12_1$–$12_m$ in a collimated light beam $P_1$–$P_m$ and for deflecting each collimated light beam $P_1$–$P_m$ in a predetermined individual deflection direction. These deflection directions are defined in a plane D of deflection (in a different plane $D_R,D_G,D_B$ for each colour), which planes either contain or are at least parallel to the lines 14,16,18 of the set of light sources 12R,12G,12B. FIG. 2b is a cross section of the pixel element 10 in one of these planes.

The optical imaging means 20 is constituted by the triple lens 22. The triple lens 22 consist of three objective lenses 24,26,28, so that they are associated to the respective lines 14,16,18 of the set of light sources 12R,12G,12B. The triple lens 22 may be a single piece, or it may consist of three separate lenses bonded together or held in an appropriate lens fixture. The lenses have double aspheric surfaces.

As best seen in FIG. 2b, the divergent beams of the light sources $12_1$–$12_m$ within one set light source set 12R,12G and 12B are collimated and deflected by this single specially designed objective lens 24,26 or 28, respectively. The objective lenses 24,26,28 are tuned to the wavelengths of the LEDs arranged along the respective lines 14,16,18.

As a result of the deflection, the light beams $P_{11}$–$P_{nm}$ are emitted in multiple directions, so that each light beam $P_{11}$–$P_{nm}$ is associated to a predetermined viewing direction (see also FIG. 3a). The number of viewing directions, e.g. m=64 correspond to the number of the light beams $P_{k1}$–$P_{km}$ having the same colour within a pixel element 10, i.e. the number of the light sources $12_1$–$12_m$ along a line 14,16,18. E.g. the j-th viewing direction is actually defined as the direction of the light beams $P_{1j}$–$P_{nj}$ which are emitted in the same direction from the pixel elements $10_{1q}$–$10_{nq}$ along the q-th line of the screen 1. In this manner the q-th line of an image seen from the j-th direction is projected by the pixel elements $10_{1q}$–$10_{nq}$.

The angle α between the light beams $P_{k1}$ and $P_{km}$ of the k-th pixel element 10k is defined as the viewing angle. The angle δ between two neighbouring light beams, e.g. between $P_{n(m-1)}$ and $P_{nm}$ is defined as the angular resolution of the system. With a viewing angle α of 60°, δ≅1° if m=64. This means that an observer will perceive two different views of the screen 1, and hence a 3D image, if the distance between the light beams $P_{kr}$ and $P_{k(r+i)}$ is not larger than the distance between the two eyes of the observer. In FIG. 3a it is illustrated with the light beams $P_{11}$ and $P_{1i}$. For i=1 and δ=1°, calculating with an average eye distance of 65 mm, this will be true for eye-screen distances below approx. 3,5 m.

The individual light sources $12_1$–$12_m$ within a pixel element 10 are individually controllable. As a result, the pixel element 10 is capable of producing the light beams necessary for a 3D display.

In order to produce a true 3D video image on the screen 1, a large amount of data must be fed continuously to each pixel. Assuming a 30 Hz image frequency (frame repetition frequency or simply frame frequency) with sixty-four different viewing directions and an 8-bit intensity resolution of the light sources, 64×30×8=15360 bits must be fed in each second into each pixel (for one colour), if no overhead bits are considered. In practice, at least 20 kB/s data rate must be calculated for each pixel element 10 of the screen 1.

The conventional approach to deliver the data to the pixels would be to provide one or several multiplexers to distribute the data to the appropriate addresses. Assuming a screen 1 which contains 860×480=412800 pixels, the technical problems of the wiring and the data sequencing will be obvious. Instead, this problem is solved according to the invention by providing serial addressing means in the pixel elements. The serial addressing means allow the data to flow through the pixel element themselves, using their own data input and output lines. There is no need for a separate data line leading to each pixel, and there is not even a data bus. The main problem of a data bus would be that the pixel elements would have to be connected to it in a parallel fashion, requiring many parallel wires. The data rate would have to be very high in order to deliver all data to all pixels, resulting in a high frequency data signal. This high frequency would have to be put through relatively long wires.

Instead, with the serial approach according to the invention, there is a permanent data flow through the pixels, so that all data wires between the pixels are contributing to the data forwarding process. In this manner, the data are sent from pixel to pixel and from LED to LED only, which means that the high frequency signal must cover much shorter distances. As a further advantage, there is no need for complicated multiplexer layouts, or an addressing wire to each pixel or an addressing bus. Instead, there is only a relatively simple bus for the clock, reset and bank shift signals, and for the voltage and ground. The data lines extend only from pixel to pixel, and no more than three data lines are needed between the neighbouring pixels.

The structure of the serial addressing means and their operation is explained with reference to FIGS. 4 to 6.

Figure 4:
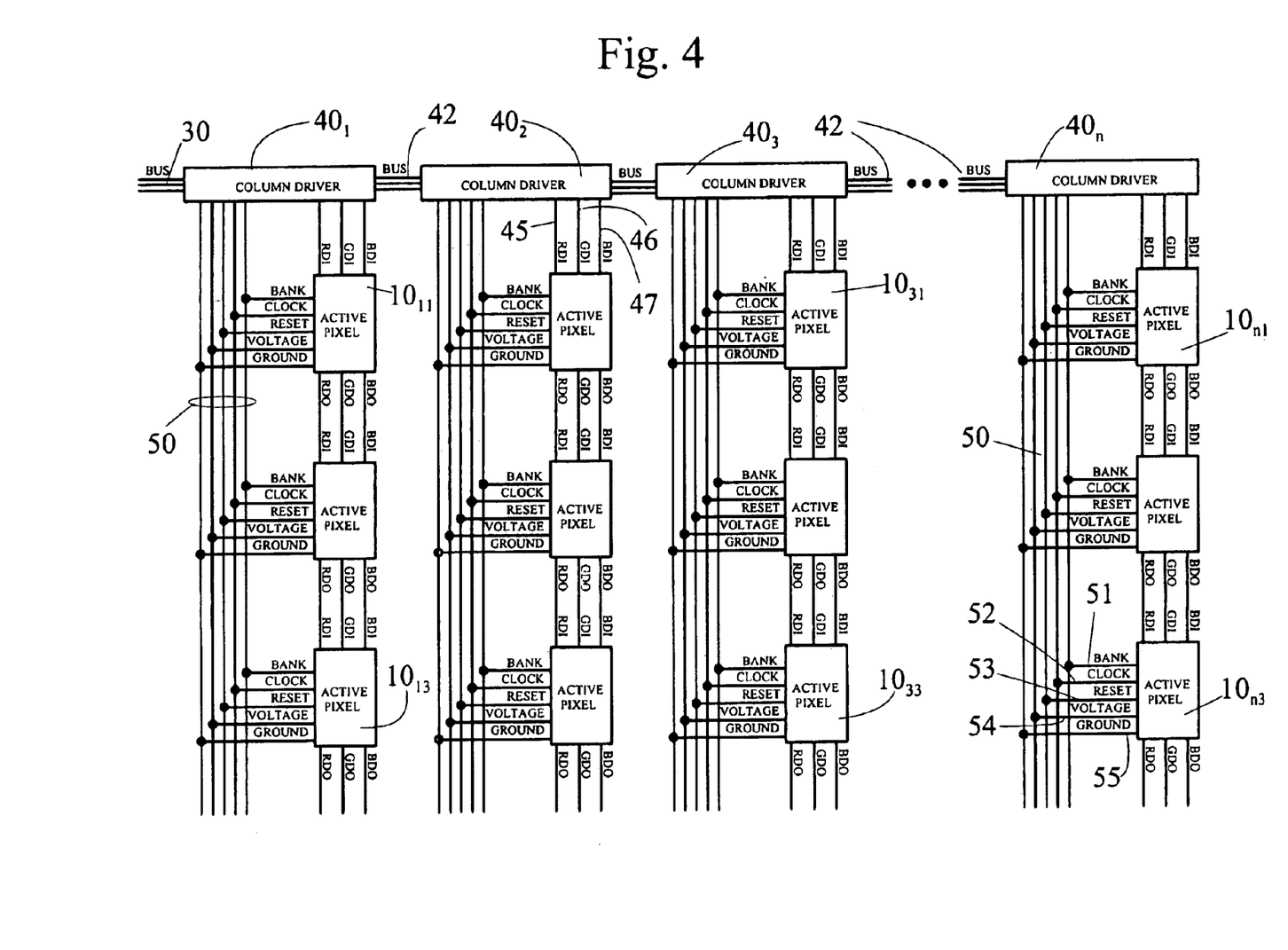
FIG. 4 is a schematic block diagram of the electronic layout of a 3D display utilising multiple pixel elements of the invention.

FIG. 4 shows the electronic layout of the screen 1. The screen 1 consists of the active pixel elements $10_{11}$–$10_{nh}$ (in FIG. 4, only h=1,2,3 are shown). Each pixel element 10 is identical to all other pixel elements, and they are arranged in h lines and n columns. The pixel elements $10_{k1}$–$10_{kh}$ (h=1, ..., 480) within one column are associated to a column driver $40_k$. The column drivers $40_1$–$40_n$ are connected with a high speed, parallel data bus 42. The data rate of the data bus 42 must be in the order of GB/s. Preferably, the data bus 42 is 64 or 128 bit parallel bus, or an optical connection. The first section of the data bus 42 is considered as the input bus 30.

The column drivers $40_1$–$40_n$ are provided with means for extracting the image data for their respective columns from the data stream going through the data bus 42. The column drivers 40 have three control output lines, namely, the bank shift line 51, the clock line 52 and the reset line 53. The control lines constitute the control bus 50, which extends across the whole height of the screen 1, along each column of pixel elements $10_{k1}$–$10_{kh}$. The column drivers 40 are also comprising three serial data output lines 45, 46 and 47 and The output lines 45, 46 and 47 are connected to the data input lines RDI,GDI,BDI of the first adjacent pixel element $10_{11}$–$10_{1n}$. (see also FIG. 5.)

The pixel elements 10 have three control inputs, three data inputs and three data outputs. The control inputs are the bank shift line 51, the clock line 52 and the reset line 53. The control inputs and the wires providing the voltage supply are branching off from the control bus 50. The data input lines RDI,GDI,BDI of the first pixel elements $10_{11}$–$10_{1n}$ in the columns are connected to the output lines 45,46 and 47 of the corresponding column driver 40, while the data input lines RDI,GDI,BDI of the other pixel elements $10_{21}$–$10_{hn}$ connect to the data output lines RDO,GDO,BDO of the previous pixel elements in the column.

Figure 5:
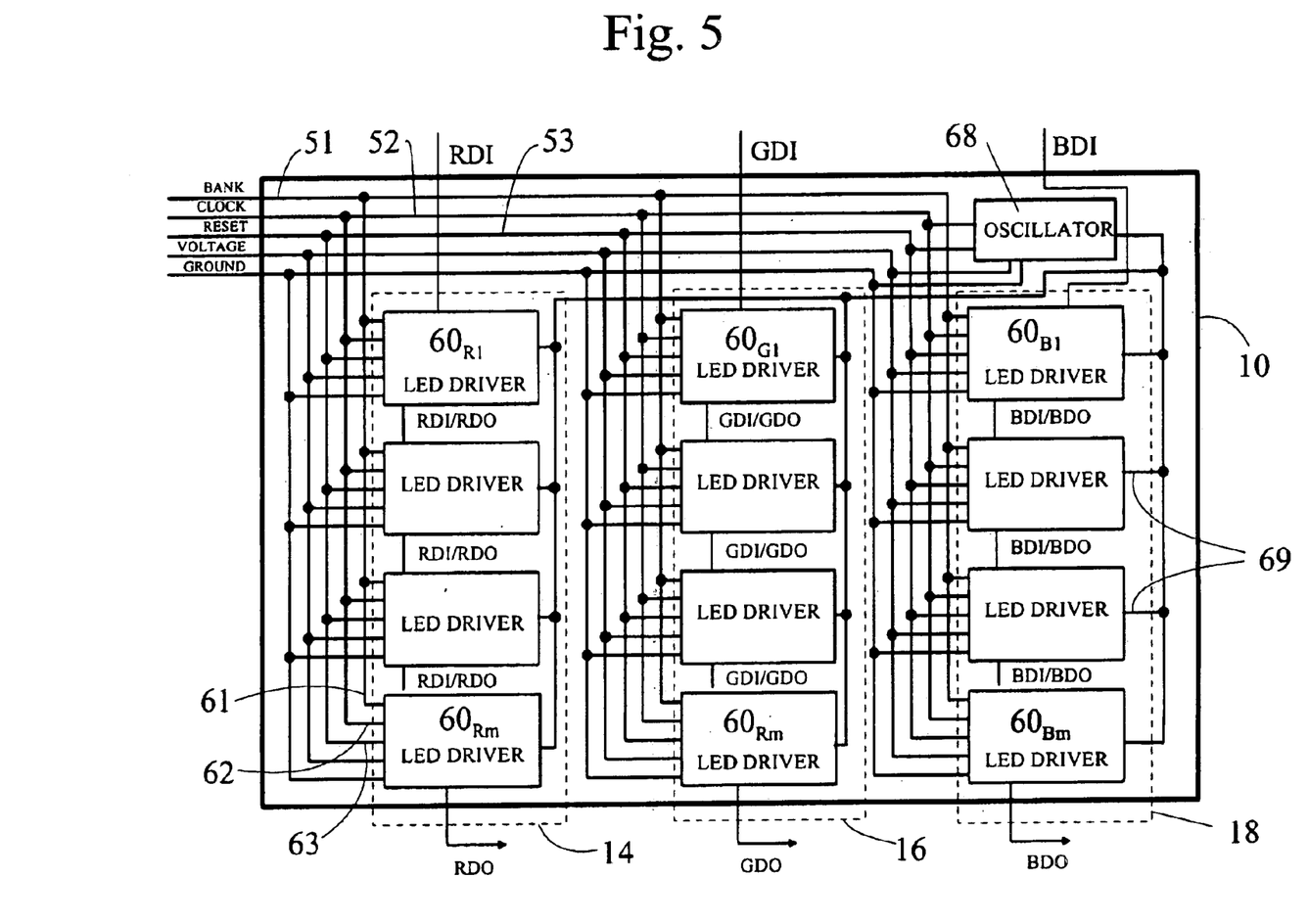
FIG. 5 is a schematic block diagram of the electronic layout of an active pixel element of the invention.
Figure 6:
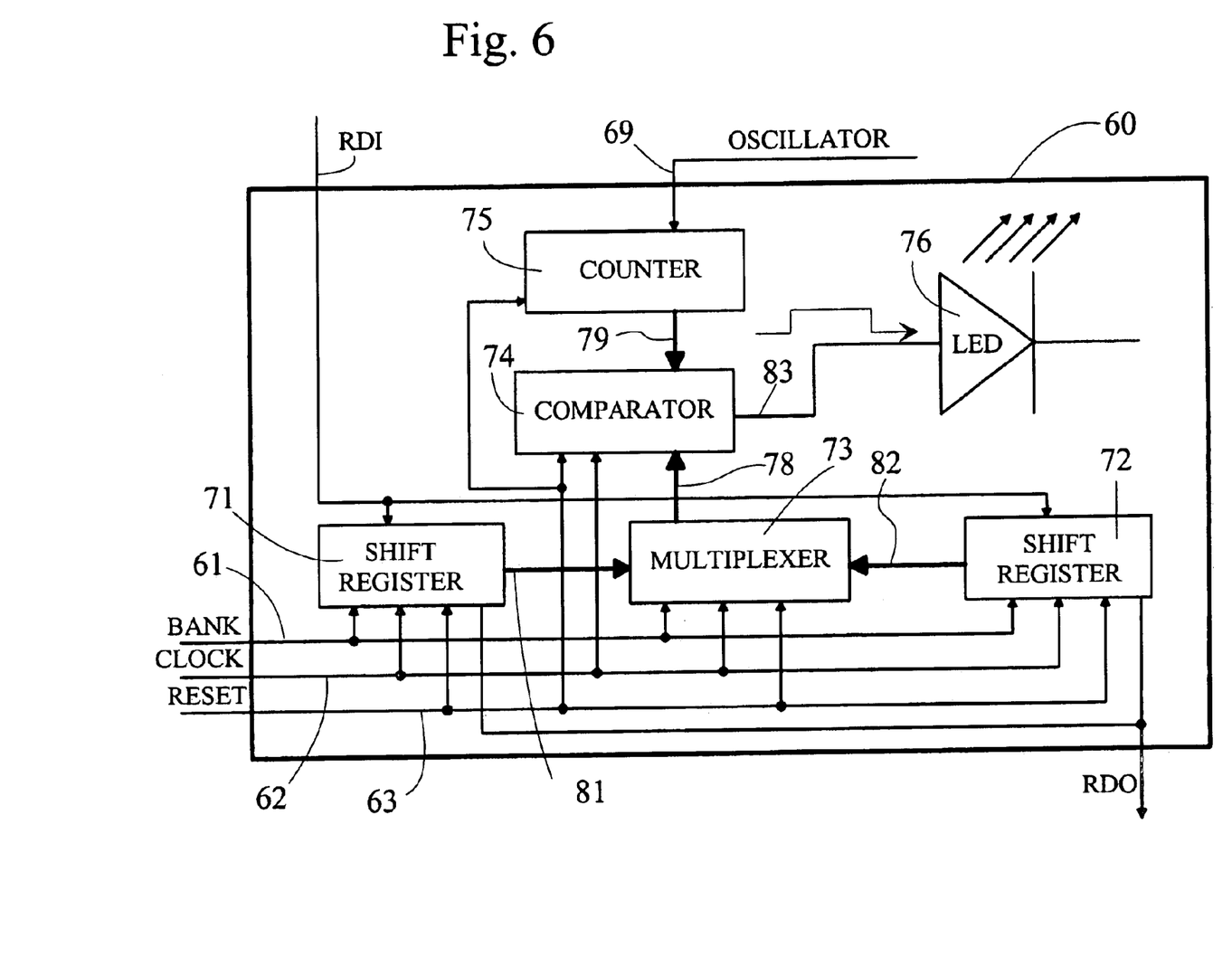
FIG. 6 is a schematic block diagram of the electronic layout of a LED driver unit within the pixel element of the invention.

The internal structure of the individual pixel elements $10_{11}$–$10_{nh}$ is illustrated in FIG. 5. The active pixel element 10 comprises led drivers $60_{R1}$–$60_{Rm}$, $60_{G1}$–$60_{Rm}$ and $60_{B1}$–$60_{Bm}$. Each one of the led drivers 60 are associated to a LED 76 (see FIG. 6), which constitutes one of the light sources 12 of the pixel element 10. As indicated in FIG. 5, by the dotted rectangles representing the lines 14,16,18, each column of the led drivers 60 is associated to the lines 14,16,18 of the light sources 12R,12G and 12B, respectively. With other words, each column of the led drivers 60 is associated to the set of LEDs emitting in a certain colour. The led drivers 60 have the same control input lines as the pixel elements 10, i.e. a bank shift line 61, a clock line 62 and the reset line 63. The control input lines of all led drivers 60 connects to the corresponding control input lines 51,52, 53 of the pixel element 10 in a parallel manner.

The led drives 60 also comprise a data input and an oscillator input 69. The data input lines RDI,GDI,BDI of the first led drives $60_{R1}$, $60_{G1}$ and $60_{B1}$ are connected to the data input lines RDI,GDI,BDI of the pixel element 10, and the data input line RDI,GDI,BDI of the other led drivers are connected to the data output line RDO,GDO,BDO of the previous led driver 60 in the same column. The data output line RDO,GDO,BDO of the last led driver again connects to the data output line RDO,GDO,BDO of the pixel element 10.

The pixel element 10 is also comprising an oscillator 68. The oscillator 68 is connected to each led driver 60 via the oscillator input line 69, so that each led driver 60 is connected parallel to the oscillator 68 by means of the oscillator input lines 69.

The led drivers 60 all have identical internal structure. This internal structure is illustrated in FIG. 6. As shown, the led driver 60 comprises a first and second shift registers 71 and 72, a multiplexer 73, a comparator 74 and a counter 75.

The serial input of the shift registers are connected parallel to the data input line RDI, while their serial output is connected parallel to the data output line RDO. Both shift registers have an 8-bit parallel output bus 81 and 82, connecting to two 8-bit parallel inputs of the multiplexer 73. The signal of the bank shift line 51 controls the multiplexer 73, i.e. controls which shift register is connected to the comparator 74 through the multiplexer 73. The shift register which is momentarily connected to the comparator 74 is termed as the passive register, while the other, non-connected shift register is the active register, for reasons explained below. The bank shift line 51 controls the shift registers as well. Namely, the connected shift register—the passive register—will not receive any data bits, but will hold its previously loaded data content, while the other, non-connected or active shift register will continuously receive and forward the serial data. E. g. if the signal of the bank shift line 51 is low, the data in the first shift register 71 are connected to the comparator 74 through the bus 81, the multiplexer 73 and the bus 78. If the signal on the bank shift line 51 is high, the data from the second shift register 72 are fed into the comparator 74 via the bus 82, the multiplexer 73 and the bus 78.

The comparator 74 is also provided with two 8 bit parallel input ports. One of them is connected to the parallel output of the multiplexer 73 via the 8-bit parallel bus 78, while the other is connected to the 8-bit parallel output of the counter 75 by means of the parallel bus 79. The counter 75 has also a serial input connected to the oscillator input line 69 of the led driver 60.

The comparator 74 has a two-state output line 83. When the comparator 74 is reset, its output will assume the first state, e.g. high. The output line 83 of the comparator changes to the other state, e.g. low, when the two equal set of bits are fed simultaneously into the parallel inputs of the comparator through the bus 79 and 79.

The output line 83 of the comparator is used to drive the LED 76 embodying one of the light sources 12, via an preamplifier if necessary (not shown). The LED 76 is driven in pulse-width modulation mode, i.e. the average output intensity of the LED 76 is modulated by the length of the time when the LED 76 is switched on.

All led drivers 60, the oscillator 68 and all the necessary wiring is formed on a single chip, integrated with the LEDs 76. Approx. 25.000 gates are necessary to make 64×3=192 led drivers 60. The approximate size of the chip is 4×4 mm. The chip has twelve connecting legs 8 (see FIG. 1), of which eleven is used for the data input and output lines and the control bus connection in the embodiment shown in FIGS. 4 to 6. The last connecting leg may be used to control the compression or image correction algorithms, as explained below.

The data flow from the input bus 30 of the screen 1 to the individual LED-s 76 of the pixel elements 10 is effected as follows:

The data containing the 3D video information is fed into the screen 1 through the input bus 30. It is assumed that the data already has a structured form, allowing the identification of those data segments which must be forwarded to the individual pixel columns. From the input bus 30, the data is going successively through the column drivers $40_1$–$40_n$. Each column driver 40 extracts those data segments, which must be forwarded into the corresponding pixel column. The column drivers 40 also transform the parallel data into serial data, essentially creating three very long data bit series, used for the three colour image information for each set of subframes in a 3D video (One subframe set consist of sixty-four subframes, where one subframe contains one still image corresponding to one viewing direction of the sixty-four different viewing directions) The screen 1 projects thirty subframe sets in every second (i.e. 64×30=192 subframes total), creating the illusion of a moving 3D image.

The data bit series assembled by the column drivers 40 for the set of subframes contains all the intensity data for the three coloured LEDs of their column. One data bit series in a column, i.e. the data bit series for one of the colours, starts with the 8-bit resolution intensity information of the m-th LED of the h-th pixel element $10_h$. This is followed by the intensity data of the (m−1)-th LED of the h-th pixel element 10, and so on. After the data for the h-th pixel element $10_h$ comes the intensity data for all the same coloured LEDs of the (h−1)-th pixel element $10_{(h-1)}$ and so forth. Accordingly, with columns consisting of 480 pixels, the length of the data bit series for one colour in one column will be 8×64×480= 245760 bits, apart from any eventual overhead bits used for error correction or other purpose.

The 245760 bits long data bit series containing the extracted image data for the respective columns are loaded serially into the data input lines RDI,GDI and BDI of the pixel elements $10_{11}$–$10_{1n}$ adjacent to the column drivers $40_1$–$40_n$. For a start, let us assume that the first shift register 71 is active under the control of the bank shift line 61, while the second shift register 72 is passive, holding the previously loaded data. Obviously, in this situation the string of shift registers 71 associated to one colour within a pixel column are all connected in series, so together they constitute a single 245760 bits long shift register. The total data bit series must be loaded completely into full column in 1/30 second, which means that the clock rate must be at least 30×= 7372800 per second, i.e. approx. 7,5 MHz. This is absolutely feasible.

When the complete data bit series have been loaded into the string of the first shift registers 71, all the intensity information bits have reached the shift registers 71 of their corresponding LED drivers. In this moment the bank shift line 51 and all the bank shift lines 61 will change, e.g. from low to high. Due to the change, the multiplexer 73 will now connect the loaded shift register 71 to the comparator 74, while the second shift register 72 will start to receive the intensity data bits for the next frame. With other words, the shift register 72 will be active, while the shift register 71 will be passive.

In the meanwhile, the comparator 74 will drive the LED 76 for a certain time interval, i.e. in PWM mode. This time interval is specified by the intensity data bits in the shift register currently connected to the comparator 74, in this case the first shift register 71. This is performed as follows:

Simultaneously with the change of the bank shift line 61, the counter 75 is reset to zero by the reset line 63. The comparator 74 is also reset, and its output 81 goes high, and the LED 76 will be on. Now the counter 75, which may be an 8-bit counter, will start to count the pulses of the oscillator input line 69. The bits representing the counted pulses are sent continuously to the parallel input of the comparator 74 through the bus 79. When the data bits on the bus 78 are equal to the bits on the bus 79, the comparator goes low again, and the LED 76 will go off. Clearly, the length of the time interval when the LED 76 is on corresponds to the digital intensity value specified for the corresponding LED 76 by the data bits in the passive shift register 71. If the frame frequency is high enough, the human eye will integrate the total emitted intensity of the LED 76, and will perceive the light of the LED 76 as if it were emitting with various intensities. Actually, the emitting intensity is the same, only the duty cycle of the light pulses is changing.

While the LED 76 is turned on and off in this manner, producing the necessary light pulse for the light source 12 of the pixel element 90, the other shift register 72 have been loaded with the intensity data of the corresponding subframe within the next frame of the video image. When the complete data bit series have been loaded into the active second shift registers 72, the bank shift lines 61 change again, and now connects the second shift registers 72 through the multiplexer 73 to the comparator 74. At the same time, the shift register 72 will be passive, while the shift register 71 will be active again. The comparator 74 is also reset again, turns the LED 76 on, and keeps it turned on for the time specified by the data bits in the second shift register 72. The displaying process is continuously being repeated, as explained above, connecting the shift registers 71 and 72 to the comparator 74 in an alternating manner.

It is understood that the pixel element 10 is working in a parallel fashion, in the sense that the image information of the next video frame is being loaded into the led drivers 60 of the pixel elements 10 while the light source 12 is being controlled according to the actually displayed frame of the video image. The passive shift register is actually acting as a data buffer holding the actually displayed image information. In this manner it is possible to apply PWM modulation to the LEDs 76, which allows longer lifetimes and better light emitting properties.

Assuming the frame frequency to be at least 30 Hz, in order to provide an 8-bit resolution in time, the pulse frequency on the oscillator input line 69 must be at least 30×256=7680 per second, i.e. approx. 8 kHz. This is not very high, so it is fully feasible to produce multiple light pulses from one LED within a frame, and thereby the flickering of the screen 1 may be reduced. E.g. with an oscillator frequency of only 35 kHz, four light pulses may be emitted within a 1/30 second frame, which would mean a virtual frame frequency of 120 Hz.

Obviously, the oscillator 68 in the active pixel 10 could be substituted by a frequency divider, which would derive the oscillator input pulses having an appropriate frequency from the clock pulses of the clock line 52. Alternatively, the frequency divider could be built into the counter 75 as well. In the present embodiment, a 1/960-th frequency divider is necessary to produce the oscillator signal from the clock signal.

The invention is not limited to the presented embodiments, but other realisations with the same inventive features is possible.

What is claimed is:

1. A pixel element for a 3D screen for displaying 3D images, said screen comprising multiple pixel elements, wherein an image displayed by the 3D screen is composed by light beams emitted from a plurality of pixel elements, the pixel element comprising, in a single unit:
    means for generating multiple substantially collimated, controllable light beams emitted in multiple directions, so that each light beam is associated with a predetermined viewing direction,
    wherein said means for generating comprises:
        at least one set of substantially point source type, individually addressable light sources arranged in a line, the light sources having individually variable intensity,
        optical imaging means for imaging the light of each light source in a collimated light beam and for deflecting each collimated light beam in a predetermined individual deflection direction, and
        means for serially addressing the light sources.

2. The pixel element according to claim 1, characterised by containing three sets of light sources radiating in the RGB colours, where each set is arranged in a line parallel with the other sets.

3. The pixel element according to claim 1, characterised by containing three sets of light sources radiating in the RGB colours, where one set is arranged in multiple parallel lines.

4. The pixel element according to claim 1, wherein the imaging means comprises a lenticular matrix and/or an objective lens associated to one line of light sources.

5. The pixel element according to claim 1, wherein, the light sources are diode lasers or LEDs.

6. The pixel element according to claim 1, wherein the deflection directions are defined in a plane of deflection containing or parallel to the line of the light sources.

7. The pixel element according to claim 1, characterised by comprising means for establishing a divergence of the light beams perpendicular to the plane of deflection.

8. The pixel element according to claim 7, wherein the means for establishing a divergence perpendicular to the plane of deflection is a holographic plate.

9. The pixel element according to claim 7, wherein the means for establishing a divergence of the light beams in the plane of deflection and the means for establishing a divergence of the light beams perpendicular to the plane of deflection are constituted by the same optical element.

10. The pixel element according to claim 1, characterised by comprising means for establishing a divergence of the light beams in the plane of deflection, in an extent sufficient to cause an overlap of the edges of neighbouring light beams at least in a distance from the pixel element.

11. The pixel element according to claim 10, characterised by comprising means for establishing a divergence of the light beams perpendicular to the plane of deflection.

12. The pixel element according to claim 1, wherein the addressing means comprises, a serial input shift register and/or a multiplexer for distributing the information from the input shift register to the individual light sources.

13. The pixel element according to claim 1, wherein the addressing means comprises a serial input buffer and/or a multiplexer for distributing information from the input buffer to the individual light sources.

14. The pixel element according to claim 1, wherein the addressing means comprises memory means for storing input information of several operation cycles.

15. The pixel element according to claim 1, wherein the addressing means comprises means for evaluating the state of the light sources radiating in the neighbouring deflection directions.

16. A 3D display for displaying 3D images, the display comprising multiple pixel elements, wherein an image displayed by the 3D display is composed by light beams emitted from a plurality of pixel elements, each pixel element comprising, in a single unit:
    means for generating multiple substantially collimated, controllable light beams emitted in multiple directions, so that each light beam is associated with a predetermined viewing direction;
    wherein said means for generating comprises:
        at least one set of substantially point source type, individually addressable light sources arranged in a line, the light sources having individually variable intensity;
        optical imaging means for imaging the light of each light source in a collimated light beam and for deflecting each collimated light beam in a predetermined individual deflection direction; and
        means for serially addressing the light sources.

17. A 3D display according to claim 16, comprising multiple parallel serial buses providing the clock, reset, voltage and ground signals for the pixel elements, and further comprising means for connecting inputs and outputs of the serial addressing means between neighbouring pixel elements.

18. A 3D display according to claim 16, comprising replaceable pixel elements.

* * * * *